United States Patent [19]
Hill et al.

[11] Patent Number: 5,528,740
[45] Date of Patent: Jun. 18, 1996

[54] CONVERSION OF HIGHER RESOLUTION IMAGES FOR DISPLAY ON A LOWER-RESOLUTION DISPLAY DEVICE

[75] Inventors: Timothy J. Hill, San Francisco; Robert M. Marsh, Berkeley; Jesse C. Newcomb, Mountain View, all of Calif.

[73] Assignee: Document Technologies, Inc., Sunnyvale, Calif.

[21] Appl. No.: 23,107

[22] Filed: Feb. 25, 1993

[51] Int. Cl.⁶ .................................................. H03M 1/66
[52] U.S. Cl. ........................ 395/128; 382/232; 382/233
[58] Field of Search ........................... 395/128; 382/225, 382/227, 232, 233

[56] References Cited

U.S. PATENT DOCUMENTS

| | | | |
|---|---|---|---|
| 4,829,370 | 5/1989 | Mayne et al. | 358/537 |
| 4,843,380 | 6/1989 | Oakley et al. | 345/137 |
| 4,924,522 | 5/1990 | Bray et al. | 382/237 |
| 5,029,107 | 7/1991 | Lee | 395/145 |
| 5,058,174 | 10/1991 | Carroll | 382/111 |
| 5,065,149 | 11/1991 | Marsh et al. | 345/132 |
| 5,153,936 | 10/1992 | Morris et al. | 395/128 |
| 5,179,639 | 1/1993 | Taaffe | 395/128 |
| 5,239,625 | 8/1993 | Bogart et al. | 395/128 |
| 5,265,176 | 11/1993 | Miller | 382/299 |
| 5,315,693 | 5/1994 | Hirosawa | 395/128 |

OTHER PUBLICATIONS

Microsoft Corporation; *Programmer's Reference, Vol. 1: Overview*; 1987–1992; pp. 79–83, 90–97, 102–105, 424–428.

Foley et al., Computer Graphics: Principles and Practice, Second Edition, 1990, pp. 180–184; 820–821; 840–842; 855–861.

*Primary Examiner*—Mark K. Zimmerman
*Assistant Examiner*—Jody R. Wingard
*Attorney, Agent, or Firm*—Schneck & McHugh

[57] ABSTRACT

A system for converting a high-resolution bitonal bit map representation of a document to a lower-resolution pixel representation for display. A special subset of the high resolution output is assigned special meanings by codes which are used to produce a real time video signal with higher bandwidth to enhance the resolution and readability of the displayed image on a lower resolution display. This is accomplished by splitting each coded pixel into two or more "twixels". The twixels produced from pixels which are not part of the special subset have the same codes as the corresponding original pixels. The twixels produced from pixels which are part of the special subset have special codes which, when displayed, duplicate certain predetermined high resolution features of the original bitonal pixel-code information on a display.

18 Claims, 10 Drawing Sheets

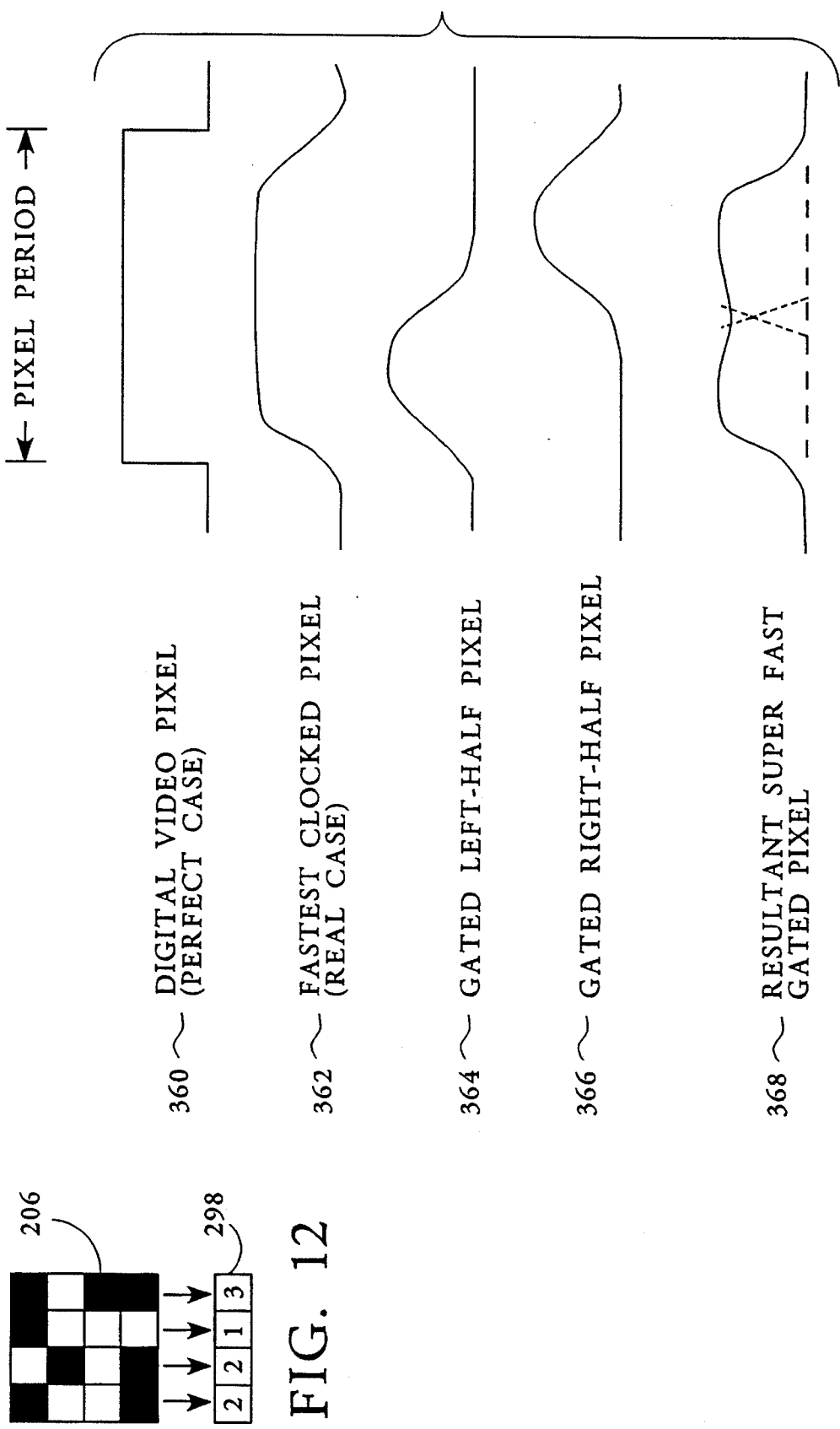

CONVERSION OF HIGHER RESOLUTION IMAGES FOR DISPLAY ON A LOWER-RESOLUTION DISPLAY DEVICE

DESCRIPTION

1. Technical Field

This invention relates to techniques for displaying high-quality scanned documents on lower-resolution display systems.

2. Background Art

Document image processing systems for paper documents are typically characterized as computer systems which acquire, store, retrieve, display and print images of the paper documents.

Acquisition in a document image processing system involves scanning a paper document to convert it to an electronic form. The electronic form is typically an orthogonal grid of pixels where each of the pixels in the grid is either black or white. This electronic form is said to be "bitonal" because each pixel can be one of only two colors, that is, either black or white.

The resolution of a scanning process is a measure of the size of the individual pixel elements. Resolution is expressed as the number of pixel elements per unit of linear measurement. Resolution is measured both horizontally and vertically. The horizontal direction is typically identified as the main scanning direction and the vertical direction is identified as the sub-scanning direction. Typical resolution values are 100, 200, 300, 400 pixels per inch. In general, higher resolution in an electronic document more accurately represents information on an original paper document. When the image for a stored electronic document is to be displayed on a computer display, the electronic document normally must undergo a conversion process prior to being displayed. The conversion process changes the electronic document to the resolution of the computer display, where the resolution of the computer display is lower than that of the electronic document. Because the resolution of the computer display is lower than the resolution of the electronic document, the conversion process typically results in a degradation or loss of some of the information contained in the stored electronic document.

Several techniques are sometimes used in an attempt to minimize the degradation or loss of information as a result of the process of converting a stored electronic document to a form suitable for display on a computer display. These techniques include: pixel decimation, scale-to-gray, and display-driver software patches.

U.S. Pat. No. 5,065,149 discloses a Simple-Scale-To-Gray (SSTG) system for providing high resolution of display images on a low-resolution display screen for statically displaying documents that are scanned into the system through a document scanner at high resolution. A real time transformation is performed on a bitonal (black/white) input image to provide a lower resolution gray-scale representation for a block of adjacent pixels.

The scale-to-gray conversion process is superior to the pixel decimation process because all of the pixels in the original document image contribute to the final displayed result. However the gray shading effect tends to have an integrating effect on the display and thus smoothes edges. This generates a somewhat fuzzy appearance in the displayed result, which is acceptable for continuous tone images but is far less acceptable for line art and text images.

Software solutions, such as the so-called driver patch approach, try to solve the limited display resolution problem by attempting to run graphical user interface systems at the higher resolutions needed for DIP systems. The number and sophistication of these software patches varies from vendor to vendor, but generally these software patches involve such things as supplying new, higher-resolution fonts, pre-scaling standard icons, and adjusting other feature size parameters.

In theory, the driver patch approach should provide a high resolution graphical user interface system without the feature scaling problems. In practice, a number of problems arise with the driver patch approach.

The first problem with driver patches is that scaling icons by pixel replication yields jagged, poor quality displays. This is also true of font substitution techniques. For correct operation, the font metrics of the new font must exactly match the standard font it is replacing. Doing this and providing a font with good legibility is very difficult. The standard fonts supplied with certain graphical user interface systems, such as the system font used in menus and dialog boxes, have been carefully tuned over a number of years by typographic experts.

The second problem with driver patches is that there are many features in a particular graphical user interface system which are simply not processed by the display driver. In this case, the feature scaling problem re-appears. This is typically true of toolbars, special custom dialog boxes, and other graphical enhancements present in many application programs. The result is a system where some features scale and others do not. This mix of scaled and unscaled features produces a confusing and sometimes unreadable display when running many standard applications.

Consequently, a need has arisen for a system to effectively display on a low resolution display screen a high-resolution bitonal (black/white) bit map obtained from a high-resolution scanning of a document.

SUMMARY OF THE INVENTION

It is therefore an object of the invention to provide a system for converting a high-resolution bitonal bit map representation of a document to a lower-resolution pixel stream suitable for display on a lower-resolution display.

Note that, while the specific illustrative examples disclosed herein may refer to input resolutions of 200, 300, or 400 dpi and to output resolutions of 100 dpi, these are illustrative values and the invention is not limited thereto.

In accordance with this and other objects of the invention, an image processing technique or system is provided in which two separate transformations are performed. This system allows a graphic user interface (GUI) system to "see" a nominal 100 dpi by 16 level gray display while simultaneously allowing the display of high resolution images with good fidelity. The net result of this system is enhanced practical graphical user interface operation and improved document image processing.

First, a high resolution bitonal bit map, which is stored in memory, is converted in non-real time, as a batch operation, into an encoded bit map, such as, for example, a n-gray level bit map and stored elsewhere at a lower resolution. Note that there is an integer scale relationship between the input bit map, which is, for example, scanned at 200, 300, or 400 dpi and the output bit map which is, for example, 100 dpi. The values of the output are normally chosen to fit into a standard palette scheme. This first conversion is called encoding, or rendering.

During this first step, a special subset of the encoded bit map output is assigned special meanings which are understood only by the circuitry which performs the second transformation described below. These special codes are not typically included in the palette accessible to the graphical user interface.

Second, the special subset of the encoded bit map codes are used to produce a real time video signal with higher bandwidth and with certain gray levels which are chosen to enhance the apparent resolution, that is, the readability of the displayed image. This real time video signal has the effect of appearing to reconstruct some or all of the high resolution detail of the original bitonal bit map. According to this technique each pixel to be displayed is converted to a pair of new pixels. Each of the new pixels is called a "twixel". This second transformation is call decoding, or mapping.

The image processing technique according to the invention is primarily applicable to black and white images, that is, bitonal images, with fine detail. Typical examples of which are typewritten papers or printed business documents. This system is not intended for use primarily with photographs or half tones images, where the eye and brain respond better to a greater number of color or gray levels, such as with a close-up photo of a person's face.

The image processing conversions according to the invention make it possible to get crisp visual presentation on a less expensive monitor than would otherwise be needed using conventional high-resolution techniques. A display controller using this type of image processing requires much less memory than, for example, the SSTG controller disclosed in U.S. Pat. No. 5,065,149.

With the capability of this image processing technique, application programs which are written for graphical user interface systems (GUIs) can easily display, even simultaneously, images which are scanned with different input resolutions without the need for lengthy software conversion in comparison with, for example, the SSTG technology.

According to the invention, a document interface system is provided which includes means for receiving original bitonal pixel-code information from a document scanned with a resolution of n dots-per-inch. Means are provided for converting the original bitonal pixel-code information with a resolution of n dots per inch to lower resolution pixel-code information, where the resolution of the lower resolution pixel-code information is less than the n dots-per-inch resolution for the original bitonal pixel-code information. Means are provided for assigning special values to a predetermined subset of the encoded bit map to indicate certain predetermined high resolution features of the original bitonal pixel-coded information. Means are provided for storing the lower resolution pixel-code information. Pixels-to-twixel conversion means are provided for converting the lower resolution pixel-code information to new higher resolution pixel-code information. These new higher resolution pixels are called "twixels". The conversion means includes means for recognizing the special codes values assigned to the predetermined subset of codes. Means are provided for enhancing the resolution of the display images for the certain predetermined high resolution features of the bitonal pixel-coded information by reconstructing the high resolution feature of the bitonal coded pixel-code information using the special pixel codes values. Means are provided for displaying the higher resolution pixel-code information.

According to one aspect of the invention, the resolution for the received bitonal pixel-code information has an integer relationship to the resolution of the pixel-code information.

According to specific other aspects of the invention, the resolution for the received bitonal pixel-code information is either 200, 300, or 400 dots-per-inch and the resolution for the pixel-code information having m-gray levels per pixel is 100 dots-per-inch while the special m-gray levels are 16 levels.

According to further aspects of the invention, the means for converting pixels to twixels includes means for splitting each pixel into two or more twixels, where each twixel has p-gray levels per twixels. The twixels for the non-special pixels have the same symmetric codes as the corresponding pixels and the twixels for the special pixels have asymmetric codes which duplicate the certain predetermined high resolution features of the original bitonal pixel-coded information. The horizontal pixels are split into twixels while the vertical pixels are not split into twixels, thereby increasing only the horizontal resolution of the displayed images.

According to another specific aspect of the invention, the low resolution pixel code information encodes those pixel values which correspond and decode to asymmetric "twixel" values. The encoding is such that should low resolution pixel code information be moved to other display systems which do not incorporate the invention (such as industry standard VGA display systems), the low resolution twixel values are decoded by the industry standard display to a gray level value which most closely approximates the information present in the original high resolution scanned document. Such images displayed on industry standard display systems are, or course, limited by the capabilities of the industry standard display.

According to another specific aspect of the invention, the means for storing the lower resolution pixel-code information includes a graphic display memory having two-phase output signals; the means for converting includes data decoding logic means for receiving the two-phase output signals of the graphic display memory and for providing a single phase output signal; and the means for providing a serial display includes a parallel-to-serial shifter and a data selector.

A display interface unit is provided for displaying high-quality scanned documents on a lower-resolution display system. The unit includes means for receiving original bitonal pixel-code information from a document scanned with a resolution of n dots-per-inch and for converting the original bitonal pixel-code information with a resolution of n dots per inch information to lower resolution pixel-code information, where the resolution of the lower resolution pixel-code information is less than the n dots-per-inch resolution for the received bitonal pixel-code information.

The display interface unit further includes means for encoding or assigning special pixel code values to a predetermined subset of gray-level codes to indicate certain predetermined high resolution features of the bitonal pixel-coded information. Means are provided for storing the lower resolution pixel-code information, wherein the means for storing the lower resolution pixel-code information includes a bit-mapped memory.

Means are provided for converting the encoded pixels to twixels. The lower resolution pixel-code information are converted to higher resolution pixel-code information, wherein the means for converting pixels to twixels includes means for splitting each pixel into two or more twixels. The means for converting pixels to twixels includes means for recognizing the special pixel codes values assigned to the predetermined subset of codes. Means are provided for enhancing the resolution of the display images for the certain predetermined high resolution features of the bitonal pixel-coded information by reconstructing the high resolution features of the bitonal coded pixel-code information using the special pixel codes values wherein the twixels for the non-special pixels have the same codes, called symmetric codes, as the corresponding pixels and wherein the twixels for the special pixels have codes, called asymmetric codes, which duplicate the certain predetermined high resolution features of the original bitonal pixel-coded information. Means are provided for displaying the higher resolution pixel-code information.

A method is provided according to the invention for displaying a bitonal-coded document scanned at a higher resolution on a lower resolution display. The method includes the steps of: converting a high resolution bitonal bit map for the bitonal-coded document, which is stored in memory into a coded lower resolution bit map; assigning a special subset of codes for certain predetermined features of the bitonal-coded document; storing the coded lower resolution pixel-code information; converting the lower resolution pixel-code information to higher resolution pixel-code information having m-gray levels per pixel in an operation known as "pixels to twixels"; recognizing the special pixel code values assigned to the predetermined subset of codes; enhancing the resolution of the display images for the certain predetermined high resolution features of the bitonal pixel-coded information by reconstructing the high resolution features of the bitonal coded pixel-code information using the special pixel codes values; and displaying the higher resolution pixel-code information.

Further aspects of the method include the resolution for the received bitonal pixel-code information being either 200, 300, or 400 dots-per-inch, the resolution for the pixel-code information having m-gray levels per pixel is 100 dots-per-inch.

Another aspect of the method includes converting pixels to twixels by splitting each pixel into two or more twixels. The invention further includes the step of assigning the non-special pixels the same symmetric codes as the corresponding pixels and the step of assigning the twixels for the special pixels asymmetric codes which duplicate the certain predetermined high resolution features of the original bitonal pixel-coded information.

The step of storing the lower resolution pixel-code information includes storing them in a graphic display memory having two-phase output signals. The step of converting the low resolution pixel code information to higher resolution pixel-code information includes data decoding the two-phase output signals of the graphic display memory, providing a single phase output signal, and serially displaying the information using a parallel to serial shifter and a data selector. As an example, the resolution for the received bitonal pixel-code information is either 200, 300, or 400 dots-per-inch and the resolution for the pixel-code information is 100 dots-per-inch.

BRIEF DESCRIPTION OF THE DRAWINGS

FIG. 12 illustrates summation of column information for a pixel cluster according to the invention.

FIG. 20 is a set of plots showing various output voltage waveforms for high-speed video pixels provided according to the invention.

BEST MODE FOR CARRYING OUT THE INVENTION

Figure 1:
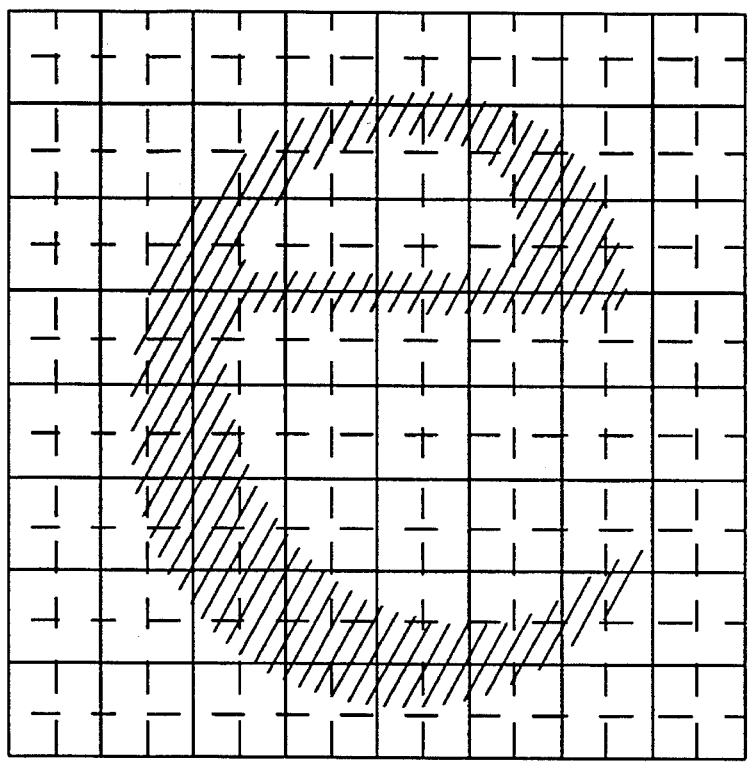
FIG. 1 illustrates a 10 point lower-case letter "e" set in the Times Roman typeface and overlaid with a 200 dpi grid, representing the resolution of commonly used document scanner, and with a 100 dpi grid, representing the resolution of most display sub-systems.

FIG. 1 shows a 10 point lower-case letter "e" set in the Times Roman typeface. This letter is the most commonly used English letter and shown set in a commonly used typeface. Overlaid on this letter are two grids. One grid is set at 200 dpi, which is the most commonly used document scanner resolution. The other grid is set at 100 dpi, which is within the target range of most display sub-systems.

Figure 2:
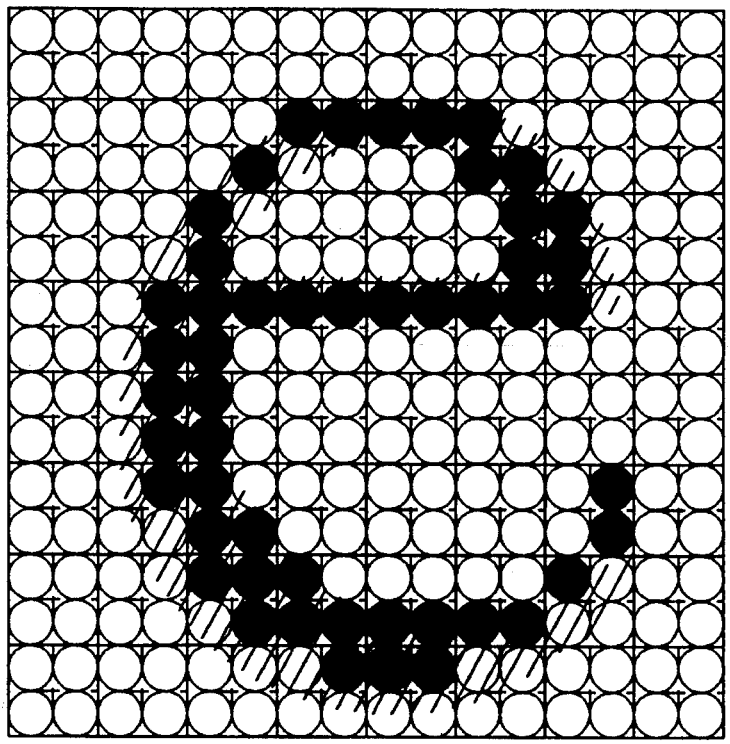
FIG. 2 illustrates the 10 point lower-case letter "e" set in the Times Roman typeface when it is scanned by a scanner at 200 dpi, or generated electronically at this same resolution.

FIG. 2 shows the dots used to form the same letter "e", when it is scanned by a scanner at 200 dpi or generated electronically at 200 dpi resolution. Note that there are many variables involved in selecting which dots are to be used to display a character, including target device, black-writer technology vs. white-writer technology, etc. As shown in the Figure, the dots are biased for a black-writer, where the dots are bleeding out of the character. The following discussion is valid for both technologies.

Figure 3:
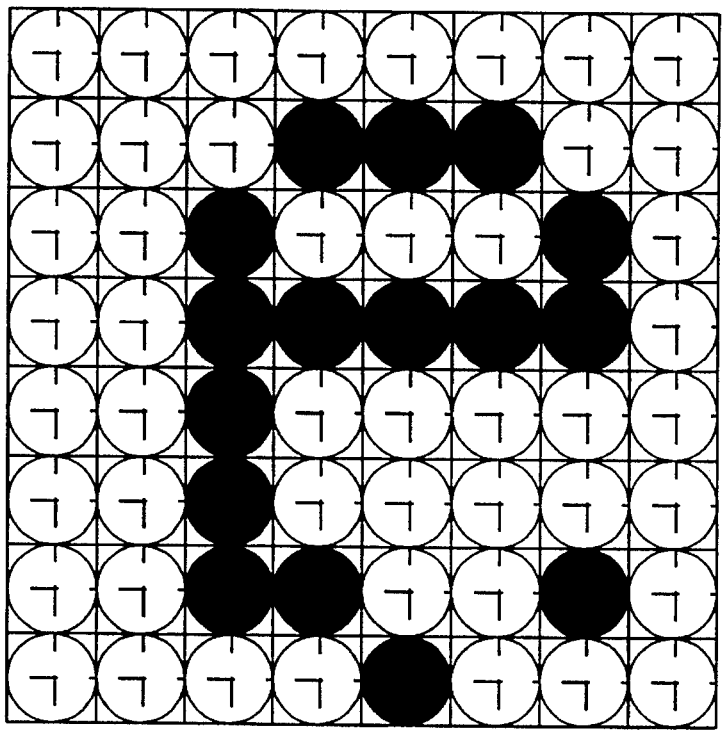
FIG. 3 illustrates the 10 point lower-case letter "e" set in the Times Roman typeface after simple pixel decimation at 100 dpi, such that it has been broken up and grossly distorted.

FIG. 3 illustrates the result of a simple pixel decimation transformation, or conversion operation. Pixel decimation attempts to solve the limited display resolution problem by using a display sub-system which has a lower resolution. High resolution scanned document images are then displayed by simply discarding excess pixels in a deterministic manner until the desired resolution is reached. For example, for a document which is scanned with a resolution of 200 dpi and which is to be displayed on a 96 dpi display, approximately every other pixel horizontally and every other line vertically is discarded. The advantages of pixel decimation are that it is fast because pixels are merely discarded and that it can be used with cheaper, mass-produced low-resolution displays. The decimation process has severe drawbacks, however, in that the quality of the resulting displayed document image is usually poor, and often unreadable, as illustrated by FIG. 3. It can be seen that a number of artifacts have been introduced in converting the letter "e" using pixel decimation. Although still recognizable, the letter has been broken up and is grossly distorted. In this example, over 75% of the pixels in the original are discarded, which is a considerable loss of information content. As a result of this poor quality, few systems use pixel decimation except for a first-approximation preview type of display.

Figure 4:
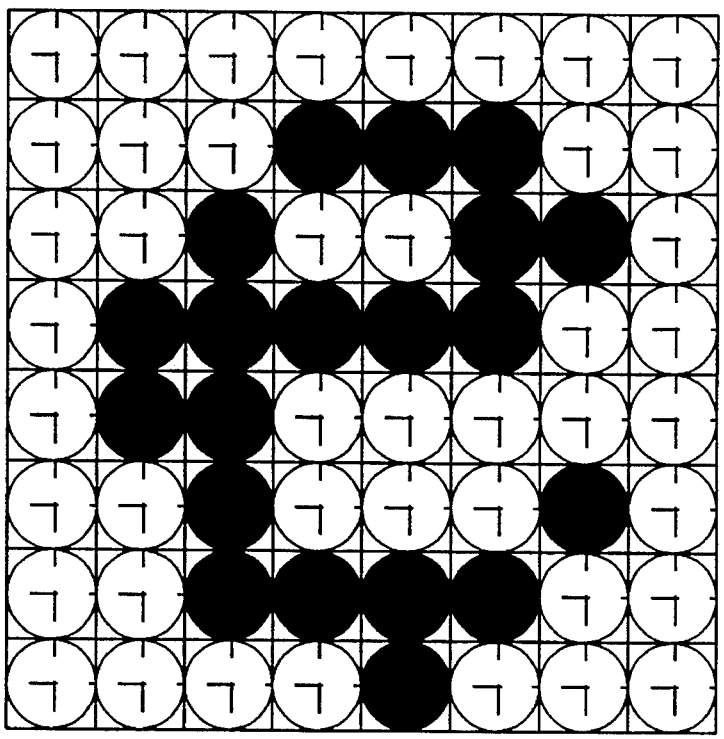
FIG. 4 illustrates the 10 point lower-case letter "e" set in the Times Roman typeface after an averaging pixel decimation, where the letter has been made considerably heavier with more black pixels.

FIG. 4 illustrates the result of an averaging pixel decimation operation. The Figure shows that, although the break-up at the bottom-right of the letter has been eliminated, various additional distortions have been introduced and the letter has been made considerably heavier by the use of more black pixels. In this variation on simple pixel decimation, all of the source pixels are considered when selecting the color of the target pixel. Such a technique is really a degraded form of scale-to-gray and is rarely used as it has little advantage over scale-to-gray and is nearly as expensive. It is used only when an output display device lacks gray scale capabilities.

Figure 5:
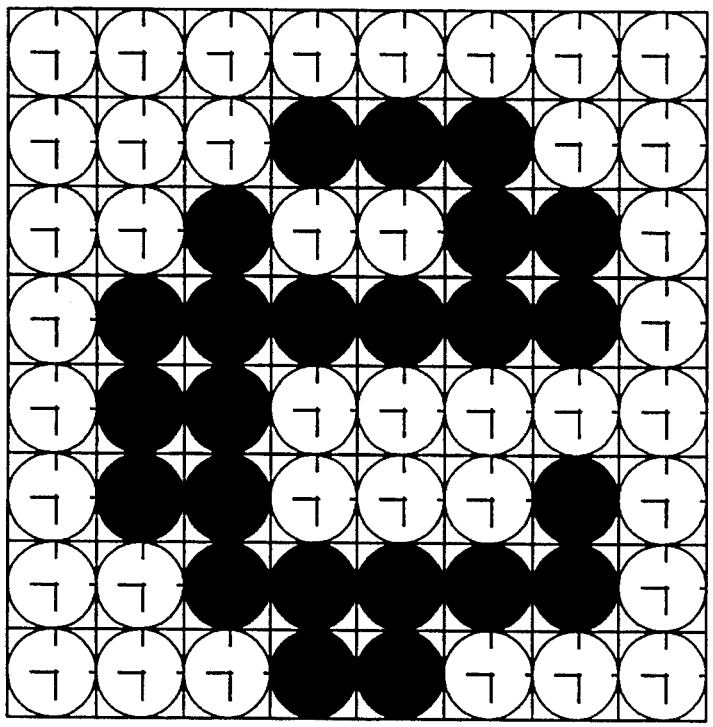
FIG. 5 illustrates the 10 point lower-case letter "e" set in the Times Roman typeface after a scale-to-gray conversion, where the letter is composed of mostly gray pixels resulting in an image with rather fuzzy, indistinct borders.

FIG. 5 illustrates the scale-to-gray approach, where the sample letter is composed of mostly gray pixels. This overcomes the disadvantages of pixel decimation and eliminates the darkening effect of pixel decimation, while maintaining correct character weights. However, the overall letter shape is now rather fuzzy, with indistinct borders. This has the effect of making the character appear slightly out of focus, which causes considerable eye strain for a viewer reading it. The scale-to-gray approach is appropriate when the display sub-system can display a number of shades of gray, preferably four or more levels of gray. As with pixel decimation the display sub-system uses a resolution which matches that needed by the lower resolution display. Higher resolution scanned document images are processed to produce lower resolution images before being displayed on a low-resolution display device. Instead of merely discarding pixels, the scale-to-gray approach provides for a gray level to be assigned to each display pixel based upon a mathematical formula which includes appropriate image pixels of the source document. Thus, when converting from a 300 dpi scanned document image to a 96 dpi display a "cell" of approximately 3 by 3 pixels is processed to generate one output pixel. Typically the pixels values are summed and an average gray level arrived at, which is then assigned to the output pixel.

Figure 6:
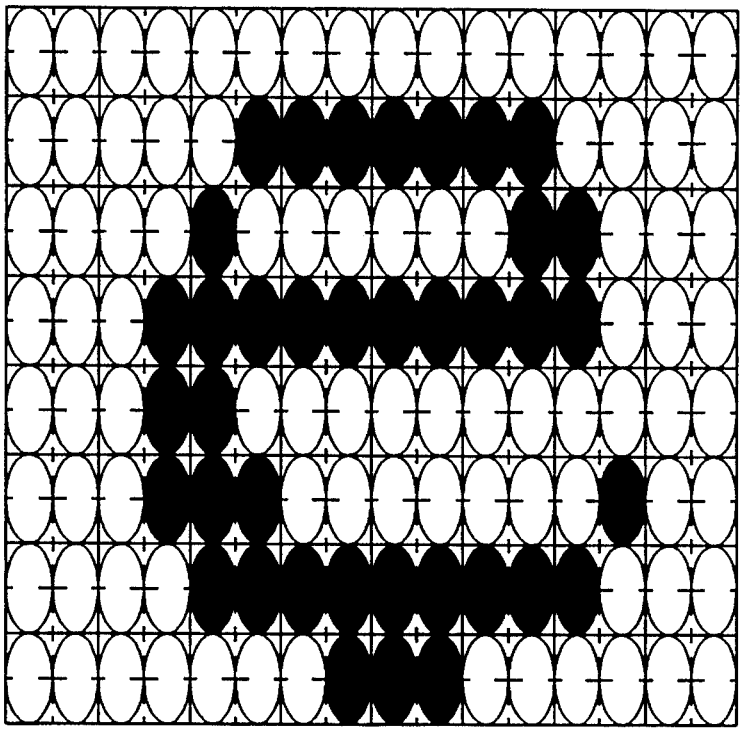
FIG. 6 illustrates the 10 point lower-case letter "e" set in the Times Roman typeface after an equivalent resolution transformation, according to the invention, where the letter is much closer to the original in shape and overall weight than with the other techniques.

FIG. 6 illustrates a display for the letter "e" produced from an input scanned at 200 dpi, according to the invention. The display of the letter is produced much closer to the original letter in shape and overall weight than with the other techniques discussed previously. In particular the enhanced shape and weight is achieved with fewer gray levels, avoiding the fuzzy outline problem inherent in scale-to-gray conversions. The result is a letter which retains almost all of the clarity of the original 200 dpi letter.

To provide the result of FIG. 6, the image-display enhancement technique provided according to the invention uses a combination of hardware and software, explained below, to provide a high resolution document image display and a graphical user interface system compatible lower resolution display simultaneously so that no mode switching is required. With the technique of the invention, document images of 200, 300 or even 400 dpi can be displayed simultaneously with superior clarity on the same 100 dpi video display. The system according to the invention has been designed to overcome certain practical limitations inherent in current graphic user interface (GUI) systems, while still providing the high display resolution demanded by DIP applications at a low cost and with little or no impact on system performance. Furthermore, the integration of the invention within, for example, the graphical user interface system API allows it to be used with little or no modifications to existing software to provide an efficient realization of improved display resolution for document image processing applications.

Briefly, the image processing technique of the invention operates by presenting the display driver for a graphical user interface system with a display format which appears to the graphical user interface system to be a simple 120 dpi by 16 gray level, 4 bits per pixel, format. This resolution and pixel depth is well within the operating range of the graphical user interface system and avoids problems with feature scaling and application-program failure. While the graphical user interface system is running non-DIP applications, the inventive features of the display driver and display hardware are essentially dormant. When the inventive features are activated, however, the display driver places special embedded codes, called twixel codes, into the display buffer. These special codes are recognized by the display hardware to produce additional output pixels for each specially coded pixel. The special codes, in effect, cause the display to switch into a higher resolution for the duration of the special pixels. This switching between resolutions occurs on a pixel-by-pixel basis so that any arbitrary mix of higher and lower resolution pixels can be displayed simultaneously. This image processing approach to DIP display sub-systems, as well as its many advantages over other techniques, is explained in more detail herein below.

The instant invention described herein receives input image data of various resolutions, but displays output data at only one resolution. For this reason, input image data must be translated from the original resolution to the resolution used for display on an attached video monitor. In all cases, this requires that the input image, which is composed only of black or white pixels, be translated into an image composed of black, white, or gray pixels at a lower resolution.

Figure 7A:
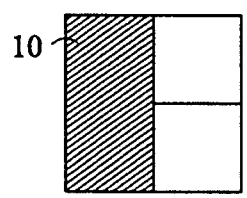
FIGS. 7a–7d illustrate encoding according to the invention for an input image having a higher resolution to an input image having a lower resolution.
Figure 7B:
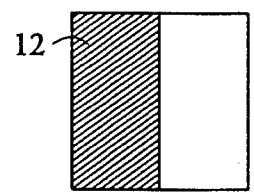
Figure 7C:
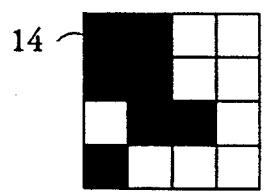
Figure 7D:
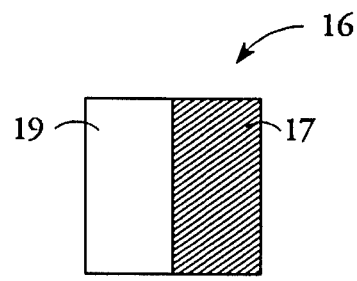

FIGS. 7a–7d illustrate examples of the concepts of the instant invention which is the translation of input image data with two different input resolutions. In FIG. 7a, the displayed image resolution is 200 dots-per-inch (dpi) on the horizontal axis and 100 dpi on the vertical axis. An input image section 10 at 200 dpi in FIG. 7a is translated to a displayed image section 12 in FIG. 7b having fewer pixels. An input image section 14 at 400 dpi in FIG. 7c resolution is translated to a displayed image section 16, also having fewer pixels. The input image 14 has only black and white pixels. The displayed image 16 has fewer pixels than the input image, but may be rendered with gray pixels 17 in addition to full black pixel 19 and white pixels, not shown. An attached lower-resolution video monitor cannot display pixels at the resolutions of the input images, but it is capable of displaying gray pixels at lower resolutions. The process of translating, that is, substituting low-resolution gray pixels for high-resolution black and white pixels is an important aspect of the invention.

Figure 8:
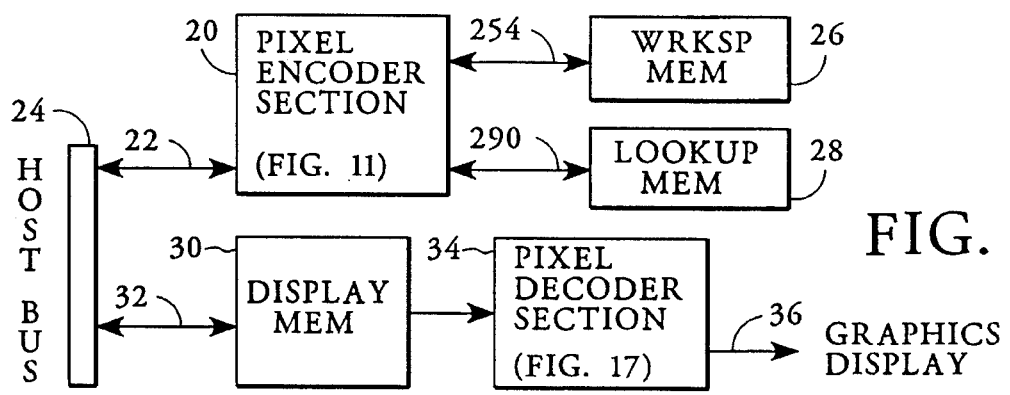
FIG. 8 shows a simplified block diagram for a coding and a decoding system, according to the invention.

The block diagram of FIG. 8 illustrates a system according to the invention. A pixel-encoding stage 20 receives high-density, or high-resolution, bitonal input pixels on a bus 22 from a host bus 24. The pixel-encoding stage 20 encodes the high-density input pixels to produce low density pixels with gray scale. A workspace memory 26 stores the received pixels and a lookup-table memory 28 provides lower-resolution, gray-coded, pixels, some of which retain certain higher-resolution features of the original high-resolution bitonal input pixels. The lower-resolution, gray-coded pixels are then delivered back out to the host bus. The host bus provides the encoded pixels to a graphics display memory 30 on a bus 32. A pixel decoder stage 34 decodes the coded pixel values and provides the video signals to a graphics display on a bus 36. The decoder stage 34 provide pixels having enhanced visibility on a lower-resolution display screen.

Figure 9:
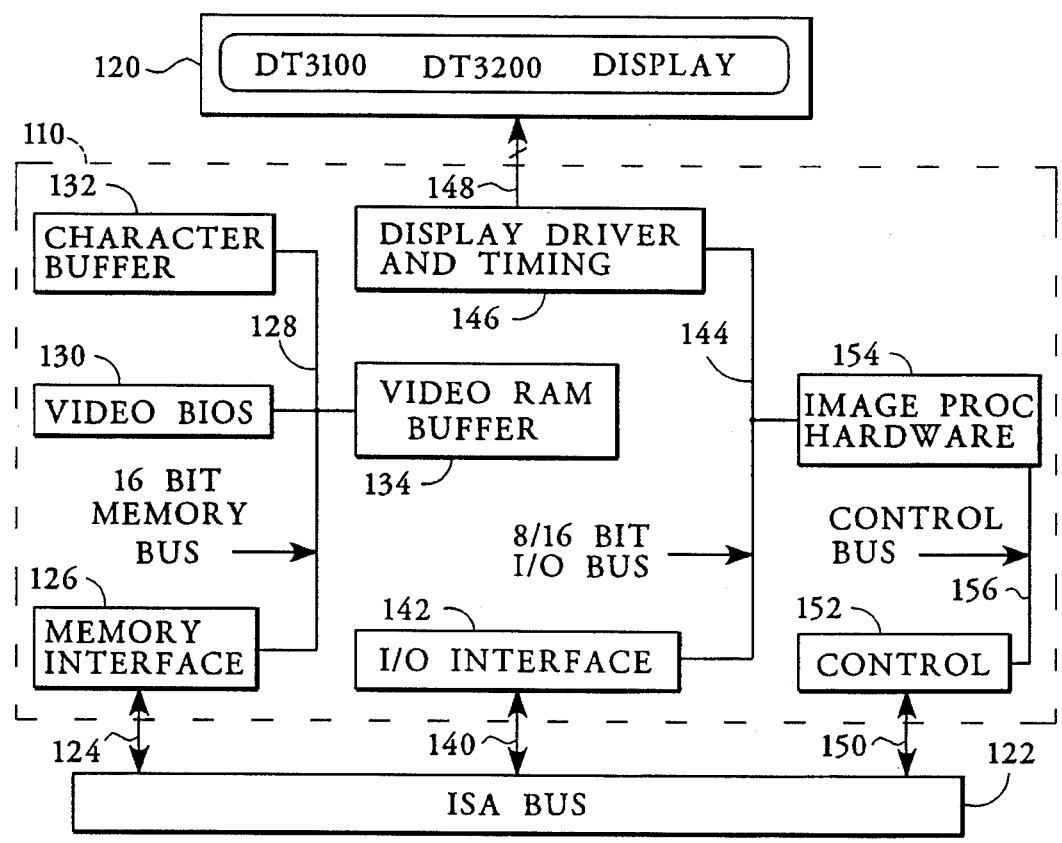
FIG. 9 shows a block diagram for a display adapter PC/AT plug-in card which is combined with a display monitor to provide dual-page, high resolution display sub-system which is fully PC and graphical user interface system compatible.

The block diagram of FIG. 9 shows a display adapter/display interface unit (DIU), which in one preferred embodiment of the invention is provided as a PC/AT plug-in card 110 for a system, provided by Document Technologies, Inc. The card includes two parts: a pixel-encoding stage and a pixel-decoding stage. The functions and operations of each part are discussed herein below.

This card 110 is combined with a display monitor 120 to provide dual-page, high resolution display sub-system which is fully PC and graphical user interface system compatible. The display monitor 120 is a graphical user interface system compatible, 120-dpi, dual-page display. The display adapter PC/AT plug-in card 110 contains a complete image processing implementation for 200, 300 and 400 dpi input document image rendering. The drivers for the graphical user interface system supplied as part of the display adapter package are aware of the specially encoded pixels and automatically invoke the pixel-enhancement features when required.

The DIU is implemented as a single ISA compatible plug-in card 110 and may be easily integrated into standard PC platforms. Although the DIU is capable of stand-alone operation with a PC chassis, it is designed to integrate easily with other components, such as a separate image control unit. Support for the DIU allows easy integration with existing software applications and platforms. The DIU support package includes high speed display drivers for graphical user interface systems and library support for image processing functions of the unit and ancillary function such as video expansion and compression. Providing library support for hardware assist functions allows faster and easier integration with DIP applications and also ensures an easy upgrade path to future DTI products.

The plug-in card 110 is connected to an ISA bus 122 through a bus 124 which connects with a memory interface circuit 126. The memory interface circuit 126 is interconnected with a 16-bit memory bus 128 to a video BIOS circuit 130; a character buffer circuit 132, and a video ram buffer circuit 134. A bus 140 connects the ISA bus 122 to an I/O interface circuit 142. An 8/16 bit bus 144 interconnects the I/O interface circuit 142 with a module 146, which includes a display driver circuit and a display timing circuit. Output terminals of the module 146 are connected through a bus 148 to the input terminals of the display 120. The display 120 is a DT 3100/DT3200 monitor provided by Document Technologies, Inc. A bus 150 connects the ISA bus 122 to a control circuit 152. The control circuit 152 and an image processing hardware module are connected with a bus 156. The hardware module is also connected to the 8/16 bit I/O BUS 144.

Pixel Encoding Stage

Figure 10:
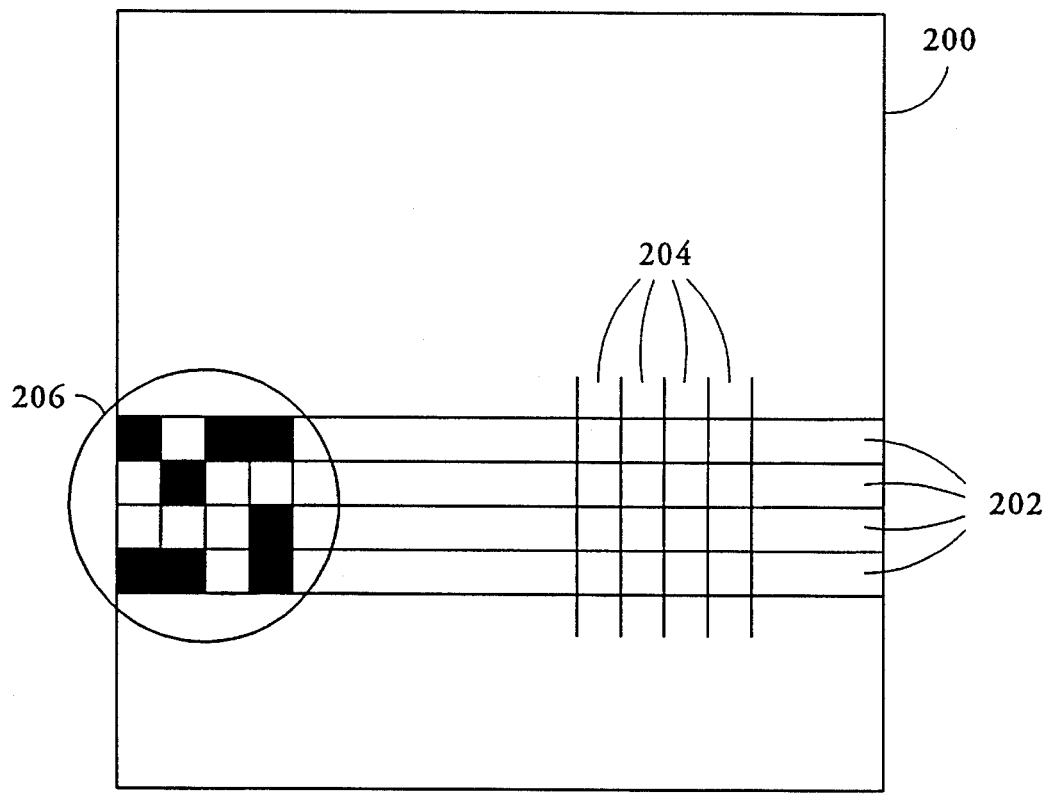
FIG. 10 illustrates a high-resolution input image.

FIG. 10 shows that the structure of the input image 200 is an array of pixels in a format of pixel rows 202 and pixel columns 204. A typical 4-by-4 pixel cluster 206 is shown as a group of black-and-white pixel, bitonal picture elements. The host system writes data as pixel rows 202. The pixel rows 202 are written in sequence from left to right, one full row at a time, to the pixel encoder section 20 of FIG. 8. As the pixel row data is written to the pixel encode section, it is strobed by a D flip-flop and synchronized to the encoder system clock with another D flip-flop, not shown. This processed data is then passed to a segment of the workspace memory 26 on a bus 254.

Figure 11:
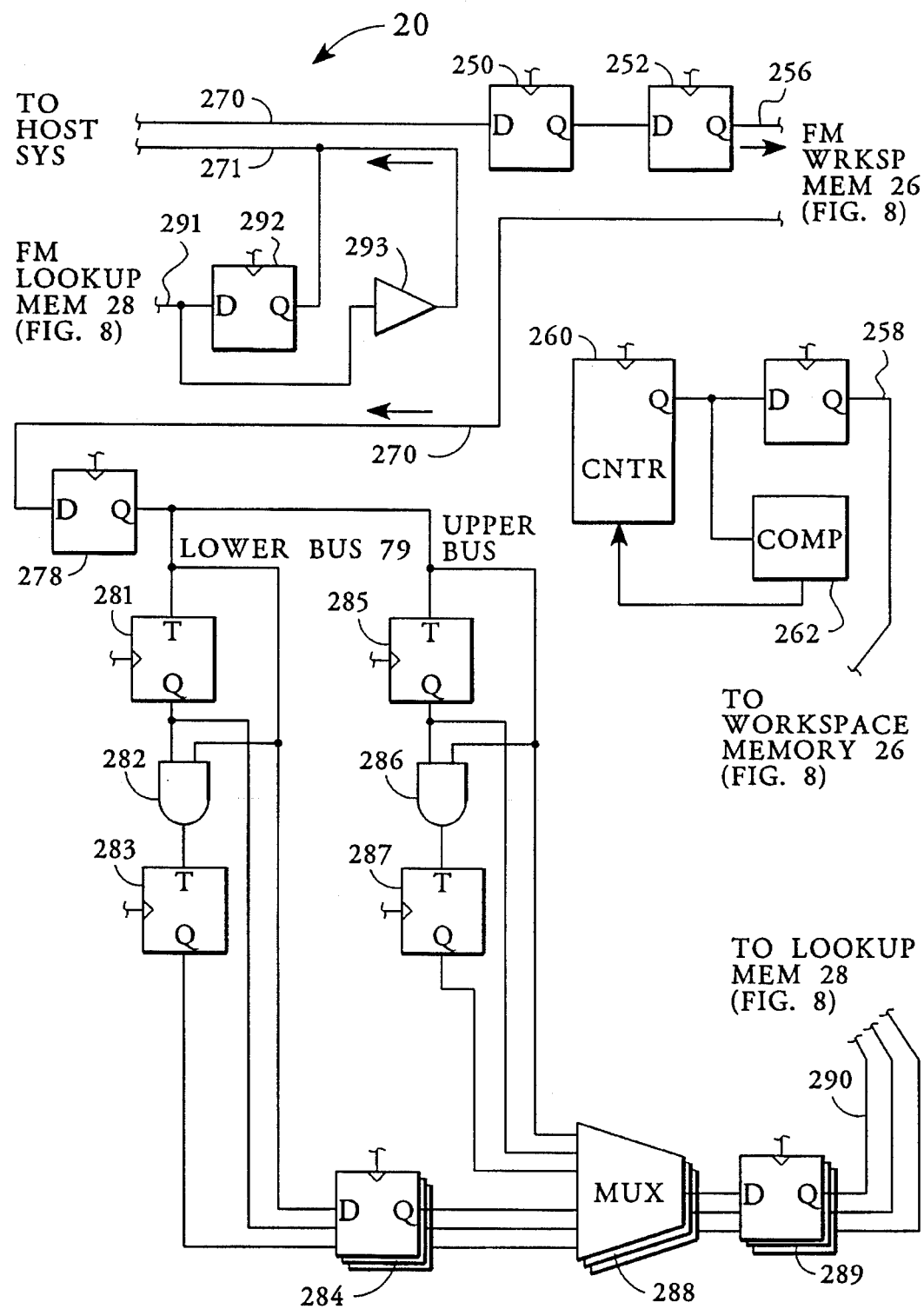
FIG. 11 is a block diagram of a pixel encoding subsystem for the system of FIG. 8.

Referring to FIG. 11, the workspace memory is addressed on a bus 258 by a counter 260, which causes pixel rows to be written laterally, as single pixel-wide strips, into the workspace memory 26. When enough data has been written to fully define one row of the pixel clusters at the chosen resolution, a digital comparator 262 determines this condition and the row must then be processed before another can be written.

When a pixel cluster row is completely written to the workspace memory 26, the pixels are then processed to be reduced as follows. The host system configures itself to read data back from the pixel encoder section 20 of FIG. 8. At the same time, the workspace memory 26 is configured to present the stored rows of the pixel clusters to the pixel encoder section 20. The workspace memory address counter 260 in FIG. 11 is configured to address the memory 26 not in rows, but in columns. Thus, as data is read from the workspace memory, the pixel encoder section sees the data as pixel columns 204 in FIG. 10.

Referring again to FIG. 11, when the first word of the input image data is presented by the workspace memory to the pixel encoder section 20 on a bus 270, it is synchronized to the encoder system clock with a D flip-flop 278 and stored in the first level of the time-based accumulator comprising flip-flops 281 and 285. The logic devices 282–284 and 286–288 function as an accumulator that calculates the sums of black pixels for the pixel columns. This first word contains the pixel data at the top of the pixel cluster 206 of FIG. 10. Because the workspace memory 26 is now being addressed in pixel columns 204, the next word to be presented to the pixel encoder section is a slice of pixels taken from the next row down, that is, pixel data that resides in the same pixel columns as the previous, but at the next position downward in the same pixel cluster. This data is presented to the first level of the accumulator, namely flip-flops 281 and 285. This data is combined with the previous data in a logical "AND" function in respective AND gates 282 and 286. Depending on the chosen resolution of the input image, a third and even fourth sample of data may be brought into the accumulator section.

FIG. 12 illustrates that, in this fashion, black pixels are counted within the columns of each pixel cluster word 206 to form single-word pixel sums 298. This word 206 of pixel sums 298 is multiplexed with a multiplexer 288 of FIG. 11 to adjust for numeric significance depending on the chosen input image resolution. The resultant value is re-synchronized to the encoder system clock using a D flip-flop 289 and is presented as address on bus 290 to the lookup table PROM type of memory 28. The lookup table is programmed with a pattern that yields a unique and compressed code word for each of the many possible pixel sum combinations. This code word is presented at the lookup table data output on a bus 291. The data is stored in a D flip-flop 292 and buffered through a buffer circuit 293 so as to present the data as wider data on the bus 271 to the host system with each host read operation. Thus, as the host reads one word of encoded pixel values on bus 271, the next such word is created by the combination in the accumulator formed by gates 282–284 and 286–288, the lookup table 28, and the workspace memory 26. This completes the iterative process of reducing input image data to the gray-encoded values.

The pixel encoding stage, encoder 20, is a special hardware scaling unit which scales monochrome document images of 200, 300 or 400 dpi to a resolution suitable for display. This stage may be accessed either via standard APIs for graphical user interface systems such as StretchBlt() or via a specific API which is part of a supplied rendering library. In either case, the document image may be presented in either monochrome bitmap or one bit per pixel DIB form.

The pixel-encoding section of FIG. 11 is a discrete circuit on a display adapter card and it is not connected to the display buffer or output stages in any way. Instead it is activated, via an API, by special I/O instructions, which allows the encoding to be performed at full bus speeds with essentially no latency or software overhead. Once activated, the encoding stage accepts as input a one bit per pixel, (bitonal, or monochrome) bitmap of any size, processes it, and prepares as an output a 4 bit per pixel display resolution bitmap. This bitmap is a rendered version of the original monochrome bitmap used as input. Note that the software driving the image processing stage typically stores the output bitmap in memory and the rendering output does not go directly to the display buffer.

The rendering performed by the pixel-encoding section during the conversion of the input to the output bitmap is a modified form of scale-to-gray. The transfer function used when generating output pixels not only detects the correct gray level to apply to each output pixel to correctly approximate the original image, but also checks for and detects specific pixel configurations in the input bitmap and emits special twixel codes in the output bitmap which encode these patterns. The twixel codes embedded in the output bitmap are concealed in such a way that, if the bitmap is rendered on a display not using the inventive image processing, the resulting display is a simple scale-to-gray version of the original full resolution input bitmap. Only when twixel codes are placed in the display buffer are they activated. This twixel hiding feature allows both types of systems to be freely mixed.

Once the output bitmap is prepared it may be painted onto the display memory 30 in FIG. 8 using normal APIs such as BitBlt(), or processed in any other way desired. Note that in low memory capacity scenarios it may be desirable to discard either the input or output bitmaps, or both, after repainting the display. In either case the high speed implementation of the rendering stage allows regeneration of the rendered bitmap with little performance penalty. Once a rendered bitmap is painted into the display memory 30, the second stage of the image processing system, the pixel decoder section 34 of FIG. 8, may be accessed.

Since DIP systems must support document images with a variety of input resolutions, such as 200, 300 or 400 dpi, the DIU display system provides a special hardware interface to assist in the rapid and accurate display of document image information using the image processing technology of the invention. This technology allows document images in a variety of resolutions to be simultaneously rendered onto the display surface with both speed and precision.

The pixel-encoding section 20 of FIG. 8 provides a front end for the decoder section 34 of the DIU, described herein below. Essentially the encoding section 20 accepts a monotone document, which is encoded with one bit per pixel at a resolution of 200, 300 or 400 dpi. The decoder section 34 also converts that monotone document to a 100 dpi form suitable for direct copy (BitBlt) to the display. Incorporated into the output pixel stream are the necessary pixel values to trigger the decoder 34 in the display output chain.

The image processing approach for enhancing a document image processing (DIP) display integrates well with graphical user interface systems and provides a number of advantages. The all hardware implementation is faster than similar software conversions. The output of the decoder section 34 is, in effect, a graphical user interface system bitmap ready for direct BitBlt to the display, with the minimum of processing. This means that display redraw/refresh operations are very fast. Since the decoder circuit provides a common output for all input resolutions, different resolution documents may be displayed simultaneously. The decoder section, described herein below, allows the fidelity of the original image to be retained. The DIU operates at full ISA bus speed.

Decoding or Mapping Stage

Figure 13:
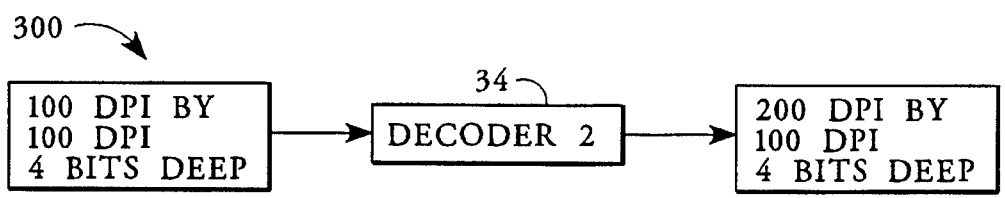
FIG. 13 shows a block diagram for a mapper, or decoding, circuit which converts the buffer information at 100 dpi to 200 dpi using special signature codes embedded within the buffer to reconstruct an original document image at high resolution.

FIG. 13 shows a general decoding stage 300 which converts the buffer information received at 100 dpi to an output at 200 dpi using special signature codes embedded within the gray-encoded data to reconstruct an original document image at high resolution. Unlike the encoding stage, which is invoked explicitly via a graphical user interface system or special APIs, the decoder stage 34 is automatically and transparently activated as part of the normal operation of the display adapter system.

Referring to FIG. 8, the pixel decoding section 34 is part of the video display electronics of the display adapter system and is logically placed within the pixel output chain. Under normal, non-enhanced conditions, the output chain fetches pixel data from the display memory 30, decodes the gray level represented by the pixel, and causes a phosphor dot of the appropriate intensity to be written at the correct location on the face of a display tube via bus 36.

While the pixel output chain is decoding individual pixels, the decoder section 34 monitors the data passing through the chain for the special twixel codes embedded by the encoding stage. If one of these codes is detected, the decoder section 34 activates and modulates the output to the monitor in such as way as to recreate on the display tube the original full resolution pixel pattern (or as much as is possible). In effect, a single input pixel is split into multiple output pixels arranged in a pattern which recreates the shape of the input image pixels sent to the encoding section 20 of FIG. 8.

The twixel detection and decoding performed by the decoder section 34 is performed at full video bandwidth. Twixels and pixels may be mixed in any combination in the display buffer. Furthermore, because the output of the encoding section 20 always provides the same display resolution, the display adapter may display 200, 300 or 400 dpi resolution document images simultaneously. The decoder circuit 34 forms part of the display timing and data buffer chain. Although the graphics buffer is organized as a 100 by 100 dpi display, the video output of the decoder is actually 200 dpi horizontal by 100 dpi vertical at 16 levels of gray. The decoder 34 therefore converts the buffer information at 100 dpi to 200 dpi horizontally using special signature codes embedded within the buffer. These codes cause the decoder to emit pixel information to the display which reconstructs the original document image at high resolution. These codes are normally generated automatically by the rendering circuit. The mapping of a 100 dpi by 100 dpi display buffer to a 200 dpi horizontal by 100 dpi vertical output involves splitting each unit pixel from the display buffer 30 into two sub-pixels, or twixels. Two horizontally adjacent twixels on the CRT are derived from a single pixel in the display buffer 34. The encoder performs two types of pixel to twixel mappings; symmetrical and asymmetrical, as described herein below.

Figure 14:
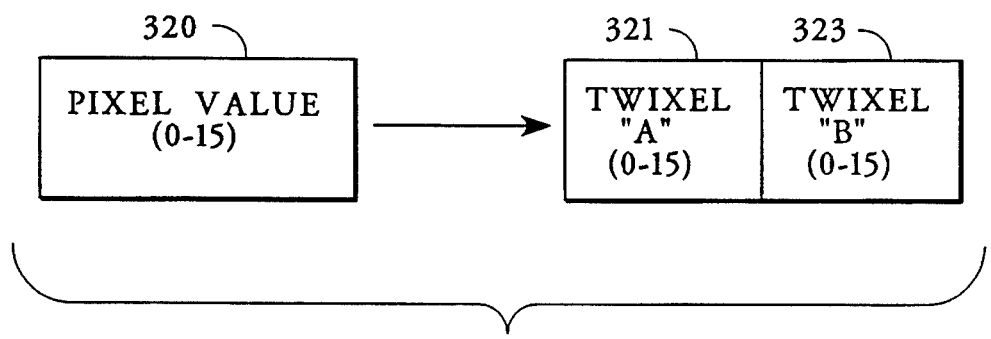
FIG. 14 illustrates the mapping of a 100 dpi by 100 dpi display buffer to a 200 dpi horizontal by 100 dpi vertical output by splitting each display buffer pixel into two sub-pixels, or twixels.

FIG. 14 illustrates the decoding, or mapping, of a 100 dpi by 100 dpi display buffer to a 200 dpi horizontal by 100 dpi vertical output by splitting each display buffer pixel 320 into two sub-pixels, or twixels 321 and 323. Symmetrical mapping simply involves an identity map, where both the "A" and "B" twixels have identical values to the original pixel. In this case the CRT effectively displays at 100 dpi horizontally. Asymmetrical mapping occurs where the two twixels do not have the same value as each other or possibly the originating pixel. It is by the use of asymmetrical mapping that the DIU is able to display high resolution document images.

Since the input to the decoder, or mapper, is in the form of 4-bit gray-level pixels, and the output is two 4-bit twixels, not all combinations of twixels may be represented in the display buffer 30 (which stores pixels). The DIU system maps 10 pixel values as symmetrical and six as asymmetrical. The mapping is shown in Table 1.

TABLE 1

| Mapping Table | | | |
|---|---|---|---|
| Pixel Value | "a" Twixel Value | "b" Twixel Value | Comments |
| 0 | 0 | 0 | Symmetric |
| 1 | 1 | 1 | Symmetric |
| 2 | 2 | 2 | Symmetric |
| 3 | 7 | 0 | Asymmetric |
| 4 | 4 | 4 | Symmetric |
| 5 | 0 | 7 | Asymmetric |
| 6 | 6 | 6 | Symmetric |
| 7 | 0 | 15 | Asymmetric |
| 8 | 8 | 8 | Symmetric |
| 9 | 15 | 0 | Asymmetric |
| 10 | 10 | 10 | Symmetric |
| 11 | 7 | 15 | Asymmetric |
| 12 | 12 | 12 | Symmetric |
| 13 | 15 | 7 | Asymmetric |
| 14 | 14 | 14 | Symmetric |

TABLE 1-continued

| Mapping Table | | | |
|---|---|---|---|
| Pixel Value | "a" Twixel Value | "b" Twixel Value | Comments |
| 15 | 15 | 15 | Symmetric |

Examination of the corresponding asymmetric twixels, which are represented as pixels 3, 5, 7, 9, 11, and 13 shows what conditions in the high-resolution input can be provided on the output display with resolutions greater than 100 dpi. For example, the pixel 3 represents an input and a displayed levels with a 7 mid-level gray value changing to a 0 level. Similarly, the pixel 5 represents an input feature and a displayed level with a gray level changing to a 7 mid-level gray value. The asymmetric values 11 and 13 provide a output which goes between the 7 mid-level and the 15 gray level. The asymmetric pixel values 7, 9, are for input and decoded features which are displayed as going between the 0 and 15 levels.

The mappings have been chosen to approximate a gray scale with 16 levels after gamma correction in the final output stage of the DIU.

Hardware Interface and Graphic Memory Map

Figure 15:
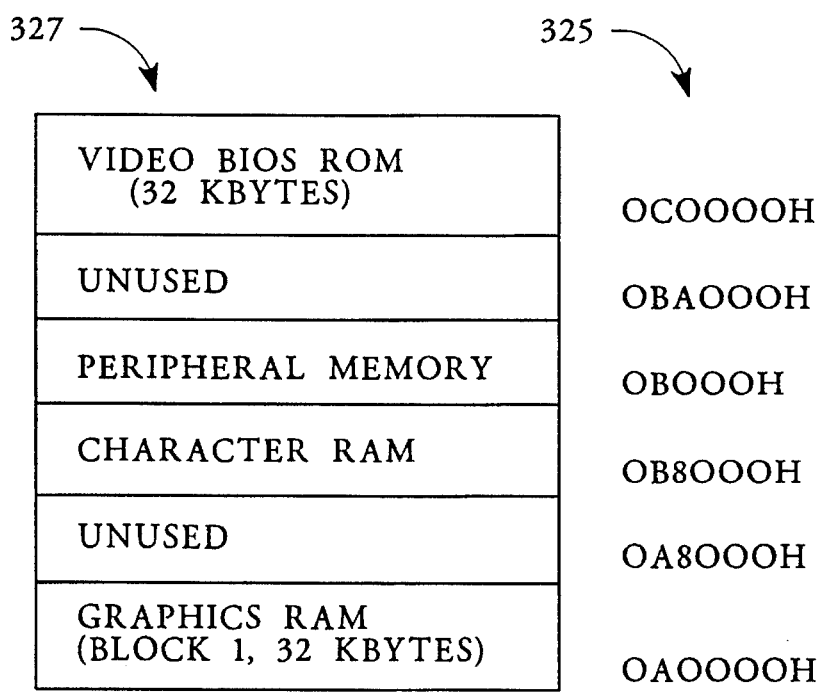
FIG. 15 shows the memory map for the equivalent resolution technology technique according to the invention.

The memory map of FIG. 15 shows host memory addresses in column 325 for functions shown in column 327. The DIU hardware is interfaced to the host via a combination of I/O ports and memory mapped addresses. Additionally the board uses two interrupts and two DMA channels for peripheral support functions. The I/O port base address is jumper selectable to allow maximum flexibility when configuring PC based DIP systems, however the default addresses assigned by DTI should not cause I/O conflicts under normal circumstances.

As shown in FIG. 12, the memory map is fixed and uses the same address space as the EGA/VGA display adapters that the DIU system is designed to replace. Additionally, an extra block of peripheral interface memory is present above the space for the character RAM. Decoding peripheral interfaces in memory space provides higher throughput on the ISA bus.

The invention contains sufficient graphics memory to display a full 1728 (horizontal) by 1168 (vertical) image at 4 bits per pixel (16 levels gray). This memory is not all directly mapped into the PC's address space, however. Instead the memory is bank switched through two 32 Kbyte windows in a similar manner to VGA adapters.

The two 32 Kbyte memory windows are located at memory addresses 0A0000H to 0A7FFFH and 0A8000H to 0AFFFFH. 32 Kbyte blocks of graphics memory may be paged into the buffer using a set of four bank-switching registers, two for each memory window. The banking is fully orthogonal and each window may be set to any 32 Kbyte block of graphics memory, aligned to a 32 Kbyte boundary. A total of 37 banks are supported.

Each window has two bank switching registers to allow the window to select a different bank for read and write operations. This greatly improves the performance of BitBlt and other graphics operations by minimizing the number of bank selects required in inner loops.

The graphics memory is mapped to the display in a highly orthogonal manner. The lowest graphics memory address corresponds to the top left of the display, and addresses increase from left to right across the display and then from top to bottom. Although each line occupies 864 bytes (1728 pixels packed two to a byte) lines are padded on the right to 1024 bytes. Thus each 32 Kbyte window spans exactly 32 lines of display memory. This mapping means that bank switch operations only need occur at line boundaries, greatly improving graphical efficiency. Memory may be accessed in a byte-wide or word-wide manner.

Figure 16:
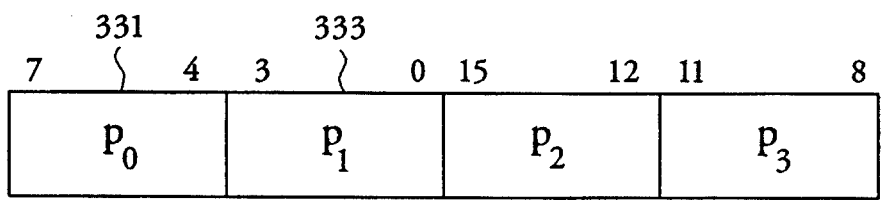
FIG. 16 shows the format for pixels which are stored in graphics memory as two pixels per byte, with the leftmost pixel occupying the high nibble in the byte and the rightmost pixel occupying the low order nibble.

FIG. 16 shows the format for pixels which are stored in graphics memory as two pixels per byte, with the leftmost pixel 331 occupying the high nibble in the byte and the rightmost pixel 333 occupying the low order nibble. The leftmost pixel occupies the high nibble in the byte (bits 4 to 7) while the rightmost pixel occupies the low order nibble. The organization of pixels when viewed as words is shown in the Figure.

Pixel Decode and Display

Figure 17:
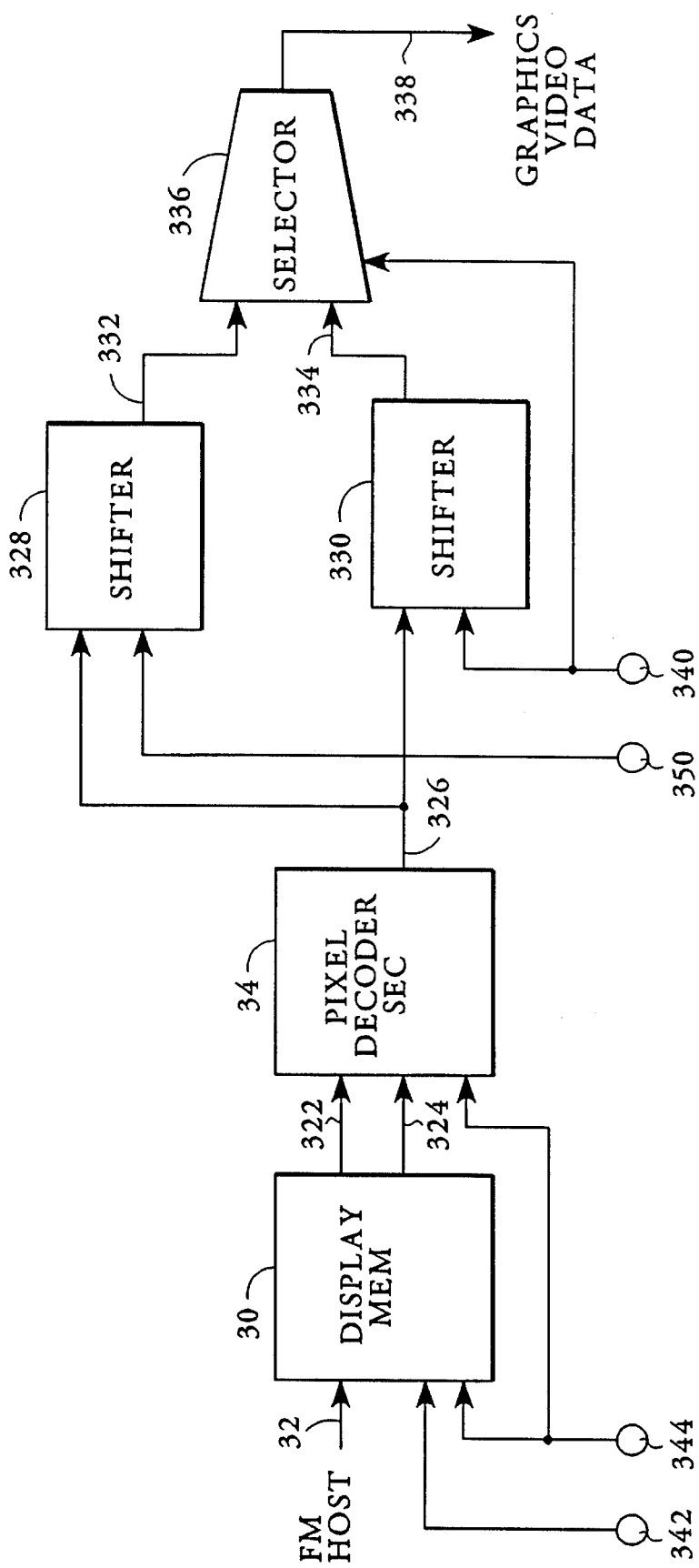
FIG. 17 shows a block diagram for a display memory and pixel decoder section shown in FIG. 8.

FIG. 17 is a block diagram of the graphics display circuit of FIG. 8, including the display memory 30 which is connected to the pixel decoder section 34. The pixel decoder section 34 provides a decode and display system, according to the invention. As compressed pixel codes are shifted out of the graphics display memory 30, they are decoded into recognizable forms and displayed on a video monitor. Because the video monitor displays data at very high resolution, the video pixel data must be decoded and transferred at very high rates. It is the function of the entire graphic display section 34 to decode the encoded pixel data into recognizable form and to transform the wide and slow parallel bits of VRAM data into narrow and fast serial video data suitable for the video monitor.

The system host processor, not shown, may read and write encoded pixel data on the bus 32 to the graphics display memory (GDM) 30. The GDM 30 is dual-ported and may be caused to shift its contents out to a decoder section 34 using buses 322, 324. From the decoder circuit 24, the decoded data is loaded through respective branches of a bus 326 into respective first and second parallel-to-serial shifters 328, 330. The shifted data is then sent through respective buses 332, 334 to the input terminals of a data selector 336. The data selector 336 presents video output data to a bus 338 as it is controlled by the phase of a clock signal presented at a clock input terminal 340. Graphics video data is thereby sent on the bus to the video display. It can be appreciated that, as this described process is carried out, the pixel data is both narrowed in time and accelerated in speed, until it is at high enough rate and density for the video display.

Figure 18:
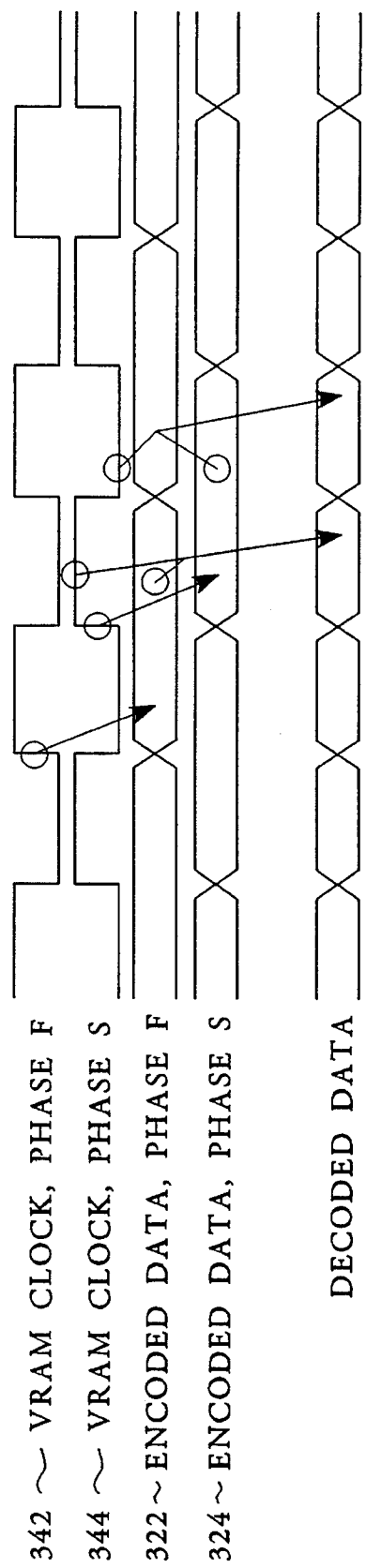
FIG. 18 is a set of timing diagrams showing the operation of a data decoder section in FIG. 17.

FIG. 18 is to be considered with FIG. 17, showing a timing diagram for the operation of the data decoder section 34. Two Video Random Access Memory (VRAM) shift clock signals are provided at the clock input terminals 342, 344. These clock signals are of equal frequency and duty cycle but of opposite phase. This causes data to be shifted from the GDM 30 onto the two output buses 322 and 324 in opposite phases, Phase F and Phase S, as indicated in the Figure. When the VRAM Clock at terminal 344 is low, Data of phase S is decoded by the pixel decoder 320. When the VRAM Clock is high, data of phase F is decoded by the pixel decoder 320. Because the data signals of these two phases are interleaved in time, such decoding provides decoded data from the pixel decoder 320 at twice the original VRAM shift rate.

Figure 19:
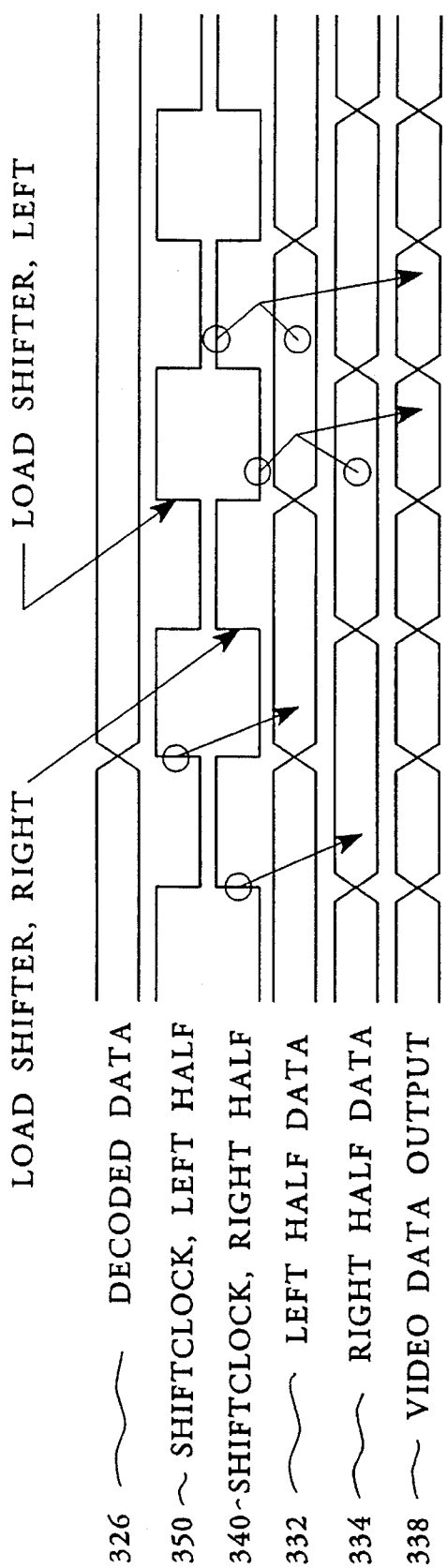
FIG. 19 is a set of timing diagrams showing the operation of the parallel to serial shifters in FIG. 17.

FIG. 19 shows a timing diagram for the operation of the parallel-to-serial shifters 328, 330 and the data selector 336 of FIG. 17. Decoded data on bus 326 is presented to the parallel inputs of the shifters 328, 330. The two shifters are operated by two separate shift clocks provided at clock input terminals 340, 350. These two shift clocks are of equal frequency and opposite phase. On each fourth shift clock pulse, new decoded data is loaded into the shifters. The shifter which runs on the left-half shift clock at terminal 350 causes left-half data to appear on bus 332. The shifter which runs on the right-half shift clock 340 causes data to appear on the bus 334. As shown in FIG. 19, both the left-half and the right-half data are in opposite phases, each changing at times when the other is stable. The data selector 336 of FIG. 17 has both left-half and right-half data as inputs. The right-half shift clock at terminals 340 causes the data selector 336 to present an interleaved pattern of left and right data as the graphics video data signal on the bus 338 to the display.

FIG. 20 shows various output voltage waveforms for the high-speed video pixels provided on the video bus 338, using the techniques described above. The perfect case waveform for a video pixel is represented by waveform 360, which shows an ideal digital signal without distortion. A clocked waveform 362 is the closest practical realization of the ideal digital case, where practical high-frequency limitations lead to significant distortion. Clocked logic is generally not capable of presenting output data as rapidly as gated logic. Hence, a gated left-half pixel 364 and a gated right-half pixel 366 are capable of cycling faster than the conventional clocked pixel waveform 362. In the electronic circuit described with reference to FIG. 17, the output video pixels are not clocked, but are gated as represented by the gated pixels 364, 366. The data selector 336 operates using gates only, and the resultant output is a super-fast gated pixel 368. This pixel may be off, on, or partially on with grayscale weighting provided for either the left or the right half. This gated video provides pixels which are faster and which have more resolution than clocked pixels.

The graphics image processing device described herein uses input data of various resolutions, but is capable of displaying output data at only one resolution. For this reason, input image data must be translated from the original resolution to the resolution used for display on an attached video monitor. In all cases, this requires that the input image, which is composed only of black or white pixels, be translated into an image composed of black, white, or gray pixels at a lower resolution. Input image data is translated to a lower resolution by process of reduction on rows and columns of encoded pixels. The reduction process uses an incremental summation method, where summed values indicate the numbers of black pixels within small areas and indicate degrees of gray shading to be used in the translated image. The pixel decoder section carries out the reduction of pixels and makes reduced, or translated data available to the host system for storage.

Specific Implementation of a Document Image Processing System

A specific implementation of a document image processing system according to the invention is provided by Document Technologies, Inc., as the ER240 DIU plug-in circuit card. For standard character display, the output signals are provided at a refresh rate of 70 Hz. with non-interlaced ECL video at 4 bits per pixel. The characters are formatted into 80 columns by 25 row array which is PC compatible using a PC 8-bit per character set. Software includes Video BIOS on the card for MS-DOS compatibility. The memory interface is memory mapped, at address B8000H into B8FFFH in 4 Kbytes.

For graphic display, a format of 1728 H by 1168 V pixels is provide with a 16 level gray scale using 4 bits per pixel. Various document page sizes are provided and the memory interface is memory mapped, A0000H to AFFFFH, Two 32K byte banks are used, each with separate read and write registers.

The image processing hardware accepts monotone inputs with resolutions of 100, 200, 300 and 400 dpi by 1 bit with any page size. Outputs have resolution of 100 dpi by 4 bit gray level, with embedded twixel codes. The speed of the system is 8.33 Mbytes/sec peak, bus limited. Performance is less than 2.5 seconds for a 400 dpi page conversion with any content and less than 0.7 seconds for 200 dpi page conversion with any content. Interfacing is with a polled CPU interface with a full multi-line buffer.

Software in the standard character mode is fully PC-compatible Video BIOS. Software in the graphics mode is the Microsoft Windows 3.x device driver. Support for the system uses graphical user interface system DLL support for all resolutions and page sizes.

Note that the system according to the invention can have output code values which do not necessarily map directly to the gray-level values of a display monitor or of a palette RAM. However, it is sometimes convenient to map the output code values of the invention to display gray codes, where those codes are only the 10 symmetric codes values described herein above in the illustrative examples.

Note also that the twixels do not need to have the same number of gray levels as the pixel values stored in the screen buffer, so that the twixels can have p-gray levels.

We claim:

1. An image-processing system for converting a higher-resolution bitonal bit image representation to lower-resolution pixel-code information retaining in decodable form certain predetermined high resolution features of the bitonal bit image representation suitable for display, the system comprising:

means for converting original bitonal pixel-code information from a document scanned with a resolution of n dots per inch to lower resolution pixel-code information, where the resolution of the lower resolution pixel-code information is less than n dots-per-inch, where said original bitonal pixel-code information is divided into a plurality of clusters of pixels, each said cluster corresponding to a pixel in said lower resolution pixel-code information;

a gray scale having m gray levels, each said gray level having a corresponding gray scale value;

a subset of said m gray levels, each gray level in said subset further having a corresponding plurality of special pixel values, whereby said subset of gray levels and said corresponding special pixel values represent certain pixel configurations in said plurality of clusters to provide an approximation to said predetermined high resolution features of said original bitonal pixel-code information;

wherein said means for converting includes means for selecting one of said clusters of pixels from said original bitonal pixel-code information and means for selecting one of said gray scale values based upon a configuration of pixel-codes within said selected cluster;

means for storing said selected gray scale value for the pixel in the lower resolution pixel-code information corresponding to said selected cluster; and means for decoding the stored lower resolution pixel-code information to produce an output data stream for display;

wherein said means for decoding includes means for recognizing gray scale values which correspond to gray levels belonging to said subset of gray levels and means, responsive to said means for recognizing, for outputting to said output data stream said plurality of special pixel values corresponding to gray levels of said recognized gray scale values, thereby substituting said recognized gray scale values in said output data stream with said plurality of special pixel values and reconstructing the predetermined high resolution features of the bitonal coded pixel-code information using the special pixel values.

2. The system of claim 1 wherein the means for decoding includes means for splitting all said pixels in said lower resolution pixel-code information into two or more twixels in the output data stream.

3. The system of claim 2 wherein each pixel having a gray level that is not within said subset of gray levels is split into symmetric twixels, each having the same gray scale value and wherein each pixel having a gray level that is within said subset of gray levels is split into asymmetric twixels, each having one of said plurality of special pixel values corresponding to said gray level to duplicate the certain predetermined high resolution features of the original bitonal pixel-code information.

4. The system of claim 2 wherein pixels are split into horizontally spaced twixels thereby increasing the horizontal resolution of the displayed images.

5. The system of claim 1:

wherein the means for storing the lower resolution pixel-code information includes a graphic display memory having two-phase output signals;

wherein the means for decoding includes data decoding logic means for receiving the two-phase output signals of the graphic display memory and for providing a single phase serial output signal;

wherein the means for providing a serial output signal includes at least one parallel-to-serial shifter and a data selector.

6. The system of claim 1 wherein the n dots per inch resolution of the original bitonal pixel-code information has an integer relationship to the resolution of the lower resolution pixel-code information.

7. The system of claim 6 wherein the resolution for the original bitonal pixel-code information is either 200, 300, or 400 dots-per-inch and the resolution for the lower resolution pixel-code information is 100 dots-per-inch.

8. The system of claim 1 wherein the means for storing the lower resolution pixel-code information includes a bit-mapped memory.

9. The system of claim 1 including means connected to said decoding means for displaying an enhanced resolution image represented by said output data stream.

10. The system of claim 1 wherein for each gray level in said subset of gray levels said corresponding gray scale value is approximately equal to an average value of said corresponding plurality of special pixel values.

11. An image-processing system for converting a higher-resolution bitonal bit image representation to lower-resolution pixel-code information retaining in decodable form certain predetermined high resolution features of the bitonal bit image representation suitable for display, the system comprising:

means for receiving original bitonal pixel-code information from a document scanned with a resolution of n dots-per-inch and for converting the original bitonal pixel-code information to lower resolution pixel-code information, where the resolution of the lower resolution pixel-code information is less than n dots-per-inch, the lower resolution pixel-code information including a first set of code values representing m-gray levels and a second set of code values, said second set being a subset of said first set wherein each code value in said second set has a corresponding plurality of special pixel values, whereby said special pixel values serve to duplicate said predetermined high resolution features;

wherein the means for converting includes means for assigning one of said first set of code values to a pixel in said lower resolution pixel-code information based upon pixel-codes in a cluster of pixels in said original bitonal pixel-code information which corresponds to said pixel;

means for storing the lower resolution pixel-code information, wherein the means for storing the lower resolution pixel-code information includes a bit-mapped memory;

means for decoding the stored lower resolution pixel-code information to produce an output data stream for display;

wherein the means for decoding includes means for splitting all said pixels into two or more twixels in the output data stream;

wherein said means for decoding also includes means for recognizing the code values belonging to both said first and second sets and for reconstructing the predetermined high resolution features of the bitonal coded pixel-code information using the plurality of special pixel values corresponding to each of said recognized code values, wherein each pixel having a code value belonging only to said first set is split into twixels with the same gray level and wherein each pixel having a code value belonging to both said first and said second sets is split into twixels with different gray levels, each gray level being selected from said corresponding plurality of special pixel values, so as to duplicate the certain predetermined high resolution features of the original bitonal pixel-code information; and means connected to said decoding means for displaying an enhanced resolution image represented by said output data stream.

12. The system of claim 11 wherein the means for storing the lower resolution pixel-code information includes a graphic display memory having two-phase output signals;

wherein the means for decoding includes data decoding logic means for receiving the two-phase output signals of the graphic display memory and for providing a single phase serial output signal; said means for providing a serial output signal including two parallel to serial shifters and a data selector.

13. The system of claim 11 wherein pixels are split into horizontally spaced twixels thereby increasing the horizontal resolution of the displayed images.

14. A method of converting a higher-resolution bitonal bit image representation to lower-resolution pixel-code information retaining in decodable format certain predetermined high resolution features of the bitonal bit image representation suitable for display, the method comprising the steps of:

converting a high resolution bitonal bit map from a scanned document into a coded lower resolution bit map;

wherein said converting step includes selecting a gray scale having m gray levels for said coded lower resolution bit map;

approximating said predetermined high resolution features including the substeps of selecting a subset of said m gray levels and selecting, for each gray level in said subset, a corresponding plurality of special pixel values;

wherein said converting step further includes selecting a cluster of pixels from said high resolution bitonal bit map, selecting one of said m gray levels based upon pixels in said selected cluster and assigning said selected gray level to a pixel in said coded lower resolution bit map which corresponds to said selected cluster;

storing the coded lower resolution pixel-code information;

decoding the coded lower resolution bitmap to produce an output data stream for display;

wherein said decoding step includes recognizing gray levels belonging to said subset of gray levels and reconstructing the predetermined high resolution features of the bitonal bitmap using the special pixel values corresponding to said recognized gray levels; and displaying an enhanced resolution image represented by the output data stream.

15. The method of claim 14 wherein the decoding step includes splitting all pixels into two or more twixels.

16. The method of claim 15 wherein for each pixel having a gray level that does not belong to said subset of gray levels, said step of splitting includes providing, for each of said two or more twixels, said gray level to said output data stream; and wherein for each pixel having a gray level that is recognized as belonging to said subset of gray levels, said step of splitting includes, for each of said two or more twixels, selecting from the plurality of special pixel values corresponding to said recognized gray level one of said special pixel values and providing said selected special pixel value to said output data stream.

17. The method of claim 14 wherein the step of storing the coded lower resolution bitmap includes storing in a graphic display memory having two-phase output signals;

wherein the step of decoding includes data decoding the two-phase output signals of the graphic display memory and providing a single phase serial output signal using two parallel to serial shifters and a data selector.

18. The method of claim 14 wherein said approximating includes identifying specific pixel configurations in said clusters of said high resolution bitonal bit map, and basing said substeps of selecting a subset of m gray levels and selecting said corresponding special pixel values upon said specific pixel configurations.

* * * * *